July 7, 1959

G. R. BAYLEY 2,893,779

FILLER ACCESS MECHANISM

Filed Sept. 17, 1956

INVENTOR.
George R. Bayley
BY
L. D. Burch
ATTORNEY

July 7, 1959          G. R. BAYLEY          2,893,779
FILLER ACCESS MECHANISM

Filed Sept. 17, 1956          2 Sheets-Sheet 2

INVENTOR.
George R. Bayley
BY
L. D. Burch
ATTORNEY

United States Patent Office 2,893,779
Patented July 7, 1959

2,893,779

FILLER ACCESS MECHANISM

George R. Bayley, Flint, Mich., assignor to General Motors Corporation, Detroit, Mich., a corporation of Delaware Application September 17, 1956, Serial No. 610,111

5 Claims. (Cl. 296—1)

This invention relates to a filler neck access door or cover and more particularly to such a door located in the bumper of an automotive vehicle.

Automotive vehicles have usually been equipped with a long filler neck extending from the fuel tank to the exterior of the vehicle and terminating in the vehicle fender or other body panels. When located in either fender, the fuel filler spout is in an inconvenient position for easy access from the opposite side of the vehicle. Previous proposals which locate the filler spout approximately on the vehicle center line have also had shortcomings. An access opening provided for a center-located spout has previously been proposed in an area between the vehicle bumper and rear deck lid where it occupies a space immediately adjacent the vehicle license plate. While this location is preferred for easy access from either side of the vehicle, it does not permit the lower edge of the rear deck lid to be located near the plane of the rear deck itself. The filler spout also occupies unnecessary space within the rear deck compartment and is of necessity undesirably long. The invention overcomes these objections by placing the filler spout at or below the level of the rear deck and providing an access cover in the face plate of the bumper. The lower edge of the rear deck lid may then extend downwardly to or near the plane of the rear deck, thus eliminating a high ridge over which luggage or other cargo must be lifted in order to place it in or remove it from the rear deck compartment, as well as permitting full utilization of that compartment. A shorter filler neck may also be used, lessening the tendency to trap air in the neck and tank and cause premature overflow of fuel when filling the fuel tank. The invention also includes an improvide hinge and spring combination which provides for easy opening and closing of the access cover while maintaining features of simplicity and endurance.

Figure 1:
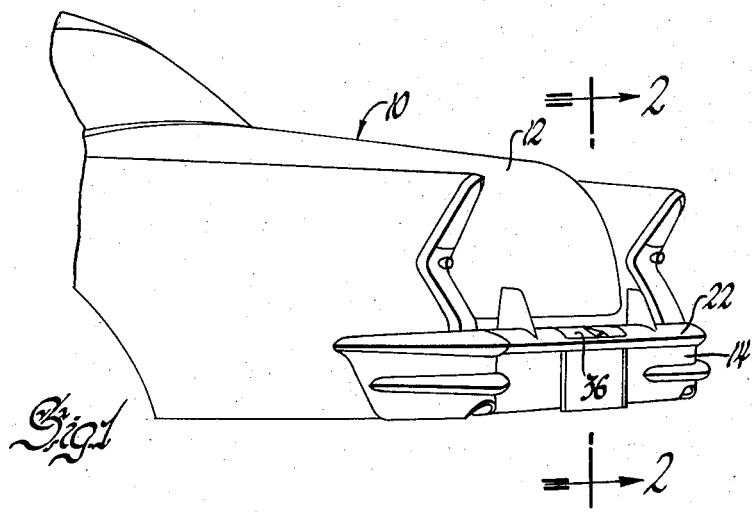
Figure 1 is a perspective view of an automobile embodying the invention.

A vehicle 10 is provided with a rear deck lid 12 and a bumper 14 which may be secured to the frame of the vehicle. Rear deck 16 of the vehicle luggage compartment is secured to body cross bar 18. An intermediate body panel 20 is located between the rear deck 16 and the lower edge of the deck lid 12. Body panel 20 may support appropriate seals for the luggage compartment against which the deck lid may be engaged when in a closed position.

Bumper 14 has a bumper face plate 22 which forms its upper surface. A stone deflector 24 may be secured to cross bar 18 and cooperate with bumper 14 to form a space 26 bounded by the bumper 14 and stone deflector 24, cross bar 18 and body panel 20. A fuel tank may be located adjacent the rear deck as is well known in the art and have a filler neck 28 extending upwardly through aperture 30, formed in deflector 24, and terminating within space 26. Filler neck or spout 28 may be provided with any known filler cap such as cap 32. Bumper face plate 22 has an aperture 34 formed therein preferably in the center section of bumper 14 which is located immediately above the terminal end of filler neck 28. An access door 36 is hingedly secured to face plate 22 at hinge axis 38 and constitutes an access closure for aperture 34.

Hinge 40 is preferably formed of two sections 42 and 44 which are secured together along the hinge axis 38 by hinge pin 46. Section 42 of hinge 40 is adapted to be secured to face plate 22 by any convenient means such as bolts 48 and 50. The edge of section 42 adjacent the hinge axis 38 is provided with hinge pin receiving sockets 52 and 54 which may be formed from section 42 and located adjacent either end of that section. Spring retainer lugs 56 and 58 are formed at either end of hinge section 42. Lugs 56 and 58 each extend in a plane perpendicular to the base portion of section 42 and in a direction generally away from the hinge axis 38. Each of the lugs has a notch 60 formed in its outer end which is adapted to receive a projection 62 formed on either end of spring 64.

Spring 64 may be formed of a wire or other material having spring properties. It is preferably formed to provide a torsion spring portion 66 near either end. Each torsion spring portion 66 may be convoluted as at 70 to allow torsional springing. The torsional portions 66 may be connected by a common connceting segment 68 extending therebetween as viewed in Figure 2. Each torsion portion 66 of the spring 64 is of a generally V-shape with the torsional convolutions 70 at the apex of the V. The center section 72 of connecting segment 68 is preferably return bent at 74 and 76 to provide a slight hook which is adapted to engage a spring retainer lip 78 extending from hinge section 44.

Figure 2:
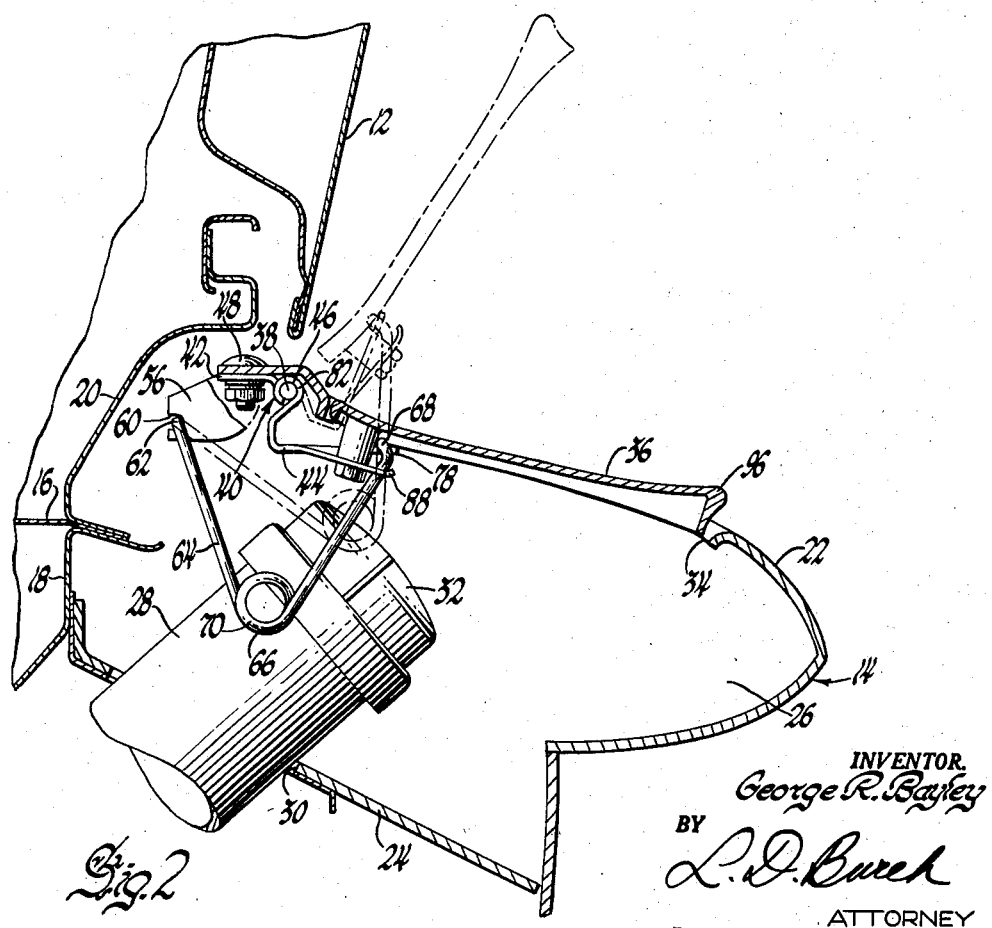
Figure 2 is a sectional view taken substantially on line 2—2 of Figure 1.
Figure 3:
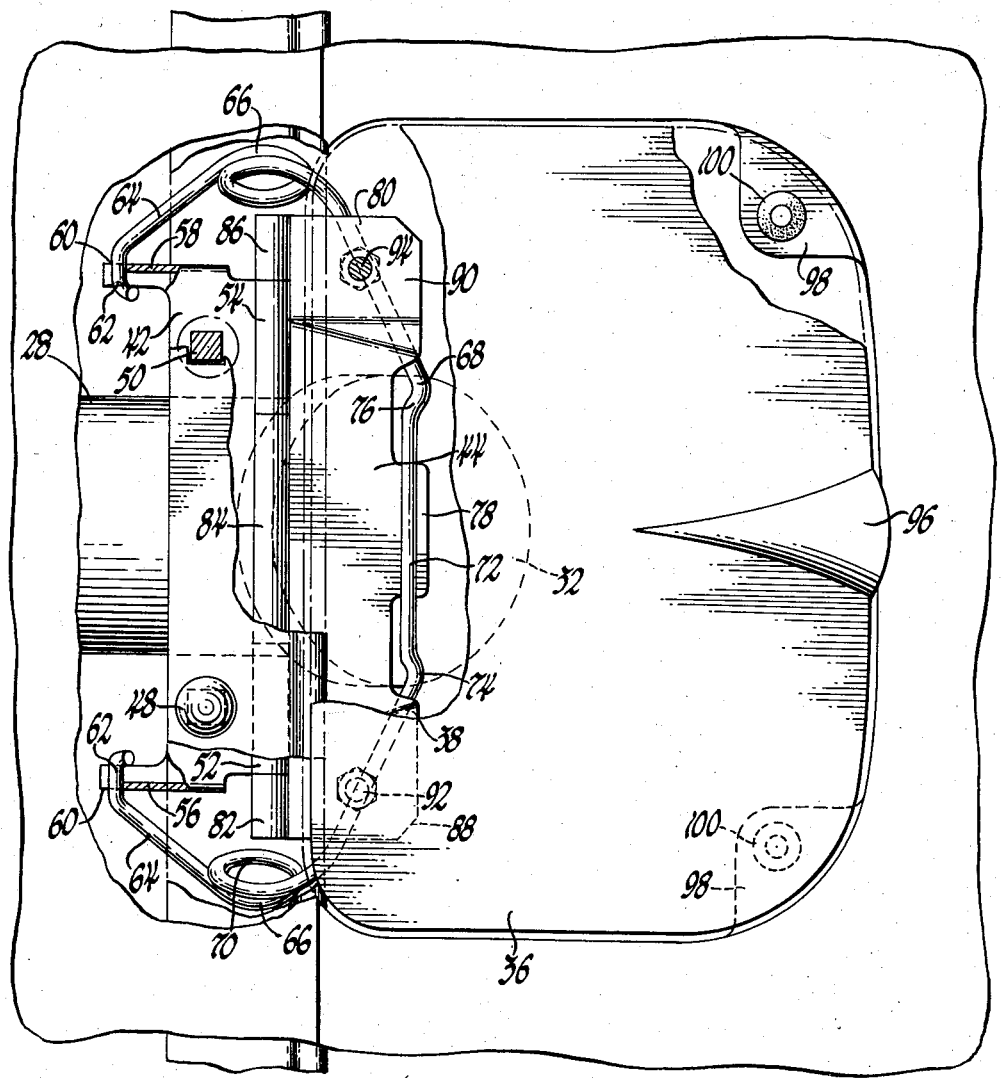
Figure 3 is a plan view of the mechanism of Figure 2 having parts broken away and in section.

Hinge section 44 comprises a flat base 80 and hinge pin receiving sockets 82, 84 and 86 formed along one edge of section 44 adjacent the hinge axis 38 and adapted to receive hinge pin 46. Sockets 52 and 54 together with sockets 82, 84 and 86 cooperate with hinge pin 46 to form the entire hinge pivot at axis 38. Either end of flat base 80 of hinge section 44 has formed therewith first and second hinge mounting lips or tongues 88 and 90 struck therefrom. Tongues 88 and 90 may be secured to the inner side of door 36 by any convenient means such as bolts 92 and 94. A third lip 78 is integrally formed from base 80 and extends in a common plane with base 80 which is parallel to and axially spaced from hinge axis 38. Lip 78 is adapted to engage one side of center section 72 of spring 64. Tongues 88 and 90 are adapted to engage the opposite side of connecting segment 68 of spring 64. Hinge section 44 may be of generally goose-necked cross section as shown in Figure 2 in order to accommodate interior mounting of hinge 40 while allowing door 36 to open outwardly.

When hinge 40, spring 64 and access door 36 are in assembled relation on bumper 14, door 36 is held in a normally closed position by the spring. The door may also be opened as shown in Figure 2 and when fully opened is held in that position by overcenter action resulting from the relative positions of spring projections 62, spring center section 72 and hinge axis 38.

Door or closure 36 may be provided with any convenient aid for opening the door such as projection 96 which may also be complementary to the automobile design. The corners of aperture 34 opposite hinge 40 may be provided with inwardly extending ears 98 which have rubber bumpers 100 mounted therein to provide a resilient stop for door 36 when in its closed position.

The invention thus provides a gasoline filler access door in the bumper of a vehicle which is functional as well as attractive. It allows optimum design for deck luggage compartments with the additional advantage of requiring a relatively short filler neck which tends to allow fuel passing through this filler neck into the tank without risk of capturing air in the tank with resultant fuel overflow.

What is claimed is:

1. In combination, a vehicle body having a frame and body panels, a bumper having a face plate, said bumper being secured to said frame and spaced from said body panels, a storage area, a rear deck and a rear deck lid cooperating with said panels and frame to provide a closure for said storage area, a filler neck for a fluid-containing tank extending under said storage area and into said bumper, said bumper face plate having an aperture therein, and an access door hinged to said bumper face plate whereby said filler neck may be exposed adjacent said face plate aperture.

2. In combination with an automotive vehicle having a bumper, a deflector secured to said vehicle adjacent and underneath a portion of said bumper, a filler neck extending through said deflector and terminating within said bumper, closure means for said filler neck, said bumper including a face plate having an aperture to provide access to said filler neck, a door hingedly mounted to said bumper and adapted to close said aperture, and means for holding said door in open and closed positions.

3. A hinged filler neck access door in a vehicle bumper in combination with a fuel tank located inboard of the vehicle from the bumper and having a filler neck extending into said bumper and terminating within said bumper adjacent said door.

4. In combination in a vehicle body, a rear deck having a lid, a fuel filler spout and a bumper, said filler spout extending rearwardly of said rear deck and into the underside of said bumper and terminating centrally inside said bumper as substantially the height of said rear deck, said bumper having a face plate center section spaced rearwardly of said deck and generally in the plane thereof and including a filler spout access port and a hinged port cover swingingly secured to said face plate to provide a closure for said port, said filler spout terminating adjacent said cover.

5. In combination in a vehicle body, a rear deck having a lid, a fuel filler spout and a bumper, said filler spout extending rearwardly of said rear deck and into the underside of said bumper and terminating inside said bumper, said bumper having a face plate upper section spaced rearwardly of said deck and including a filler spout access port and a hinged port cover swingingly secured to said face plate to provide a closure for said port.

References Cited in the file of this patent

UNITED STATES PATENTS

| | | |
|---|---|---|
| 1,995,088 | Bellamy | Mar. 19, 1935 |
| 2,236,670 | Cadwallader | Apr. 1, 1941 |
| 2,568,409 | Phillips | Sept. 18, 1951 |
| 2,707,650 | Lawton | May 3, 1955 |
| 2,759,755 | Johnson | Aug. 21, 1956 |